(12) United States Patent
Natta et al.

(10) Patent No.: US 7,736,512 B2
(45) Date of Patent: Jun. 15, 2010

(54) METHOD FOR THE PRODUCTION OF NATURAL ENERGY FROM WASTE

(75) Inventors: Giuseppe Natta, Giussago (IT); Gianni Donati, Giussago (IT)

(73) Assignee: Ecodeco S.R.L., Milan (IT)

( * ) Notice: Subject to any disclaimer, the term of this patent is extended or adjusted under 35 U.S.C. 154(b) by 908 days.

(21) Appl. No.: 11/587,029

(22) PCT Filed: Apr. 18, 2005

(86) PCT No.: PCT/EP2005/004099
§ 371 (c)(1),
(2), (4) Date: Oct. 20, 2006

(87) PCT Pub. No.: WO2005/102547
PCT Pub. Date: Nov. 3, 2005

(65) Prior Publication Data
US 2007/0221572 A1    Sep. 27, 2007

(30) Foreign Application Priority Data
Apr. 23, 2004   (IT) .......................... MI2004A0803

(51) Int. Cl.
| | |
|---|---|
| C02F 3/30 | (2006.01) |
| C12P 1/00 | (2006.01) |
| C12P 1/02 | (2006.01) |
| C12P 1/04 | (2006.01) |
| C12P 1/06 | (2006.01) |
| C12P 39/00 | (2006.01) |
| C12N 1/00 | (2006.01) |
| C12P 7/00 | (2006.01) |
| C12P 7/04 | (2006.01) |

(52) U.S. Cl. ....................... 210/605; 435/819; 435/801; 435/41; 435/42; 435/132; 435/153; 435/162; 435/170; 435/171; 435/243

(58) Field of Classification Search ................. 210/605; 435/41, 42, 132, 152, 162, 170, 171, 243, 435/801, 819
See application file for complete search history.

(56) References Cited

U.S. PATENT DOCUMENTS

| | | | | |
|---|---|---|---|---|
| H1149 | H | * | 3/1993 | Wyman et al. ........... 435/290.2 |
| 5,735,225 | A | * | 4/1998 | Natta et al. ................. 110/346 |

FOREIGN PATENT DOCUMENTS

| | | |
|---|---|---|
| EP | 0 706 839 | 4/1996 |
| EP | 1 386 675 | 4/2003 |
| EP | 1 398 088 | 7/2003 |

OTHER PUBLICATIONS

Adiani, et al. 2004. Biostabilization of municipal solid waste. Waste Management, vol. 24, pp. 775-783.*

* cited by examiner

Primary Examiner—Jon P Weber
Assistant Examiner—Kailash C Srivastava
(74) Attorney, Agent, or Firm—Porzio, Bromberg & Newman, P.C.

(57) ABSTRACT

The method aims at obtaining from waste and more particularly from municipal solid waste (MSW) the energy contained therein at the highest level for industrial use by means of natural technologies and with low environmental impact. The method, denoted by the acronym NEW (Natural Energy from Waste) operates through the following process phases: a) aerobic digestion of the putrescible biological part to produce stabilized waste which is easy to handle, b) separation of a fraction rich in materials with a high heat value, c) storage of the residue, rich in biodegradable and inert substances, compacted into appropriate geometrical shapes in bioreactors which can be activated and sealed, d) activation of the bioreactors with water and their service in time during anaerobic digestion to supply biogas to be used for the production of energy, e) bio-stabilization and dehydration of the residual material of the anaerobic treatment with air, f) possible recovery of the materials produced in this way. In this way the energy contained in the waste, is extracted at the most refined level in the form of plastic, plastic/paper and methane for energy uses with maximum yield and reduced production of ash, and the end material leaving the bioreactors is fully exhausted of its energy content and inertised.

11 Claims, 4 Drawing Sheets

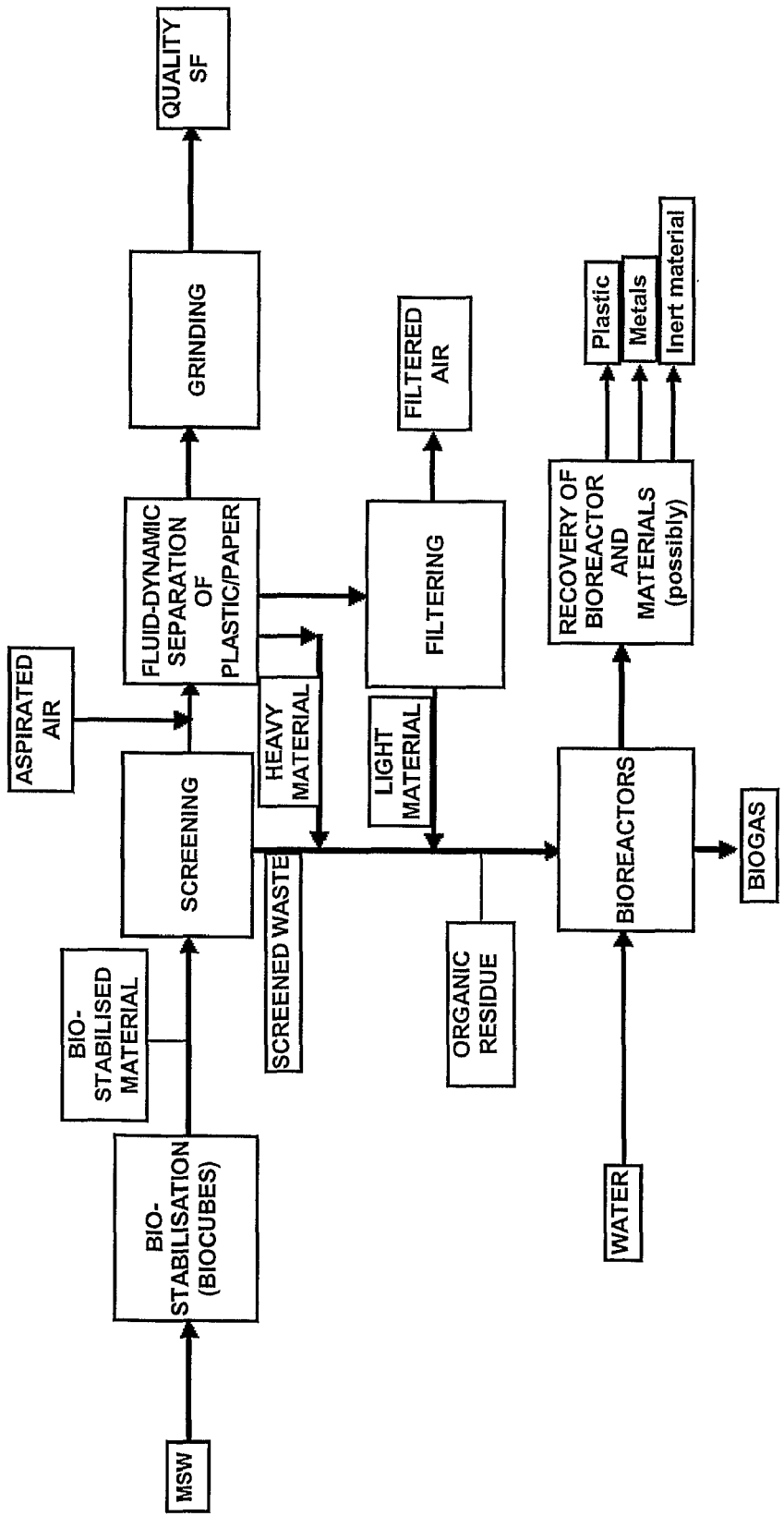
FIG. 1 LIFE CYCLE OF MSW FROM BIO-STABILISED MATERIAL TO QUALITY WDF, ORGANIC RESIDUE AND BIOGAS

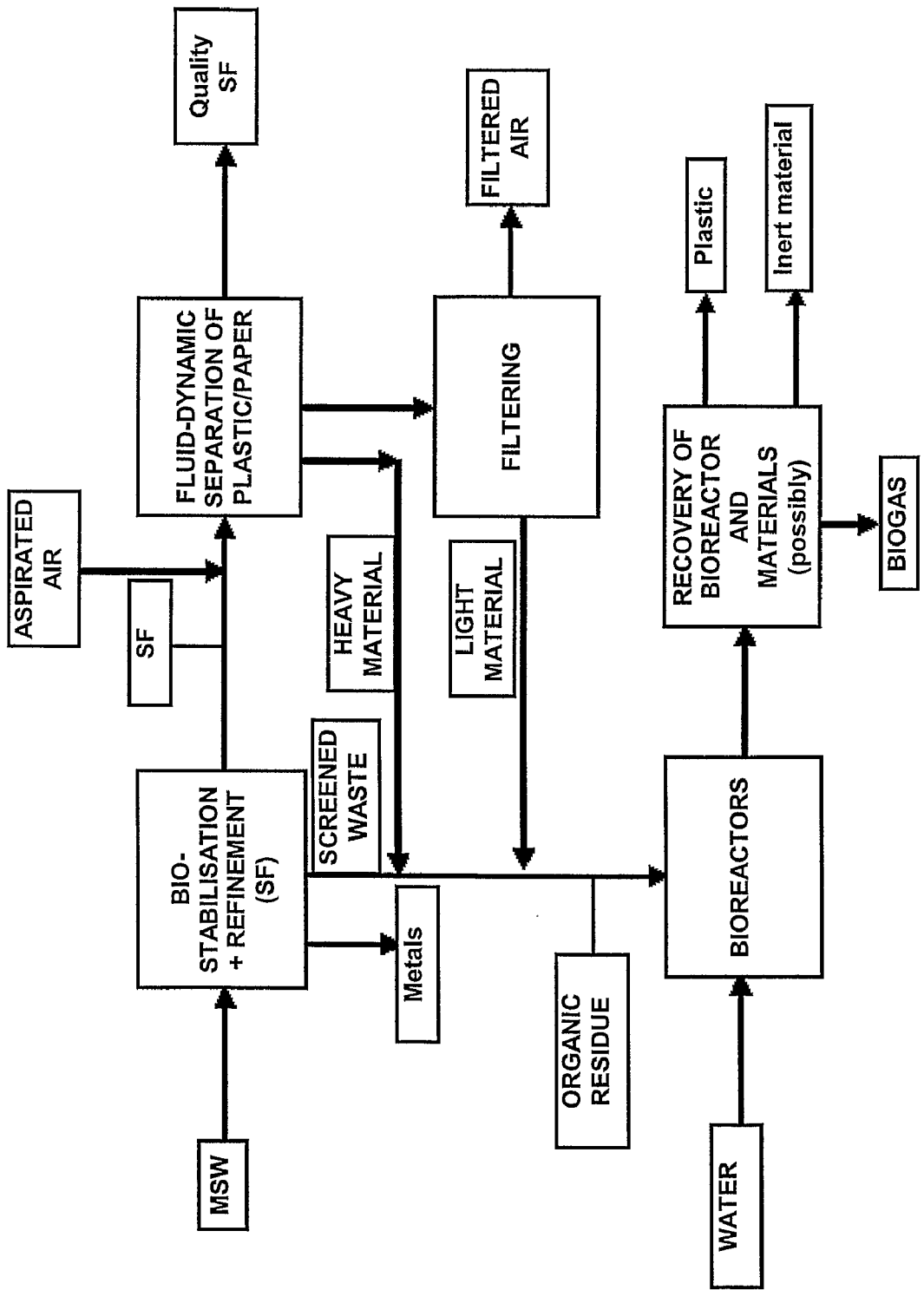
FIG. 2  LIFE CYCLE OF MSW FROM RDF TO QUALITY RDF, ORGANIC RESIDUE AND BIOGAS

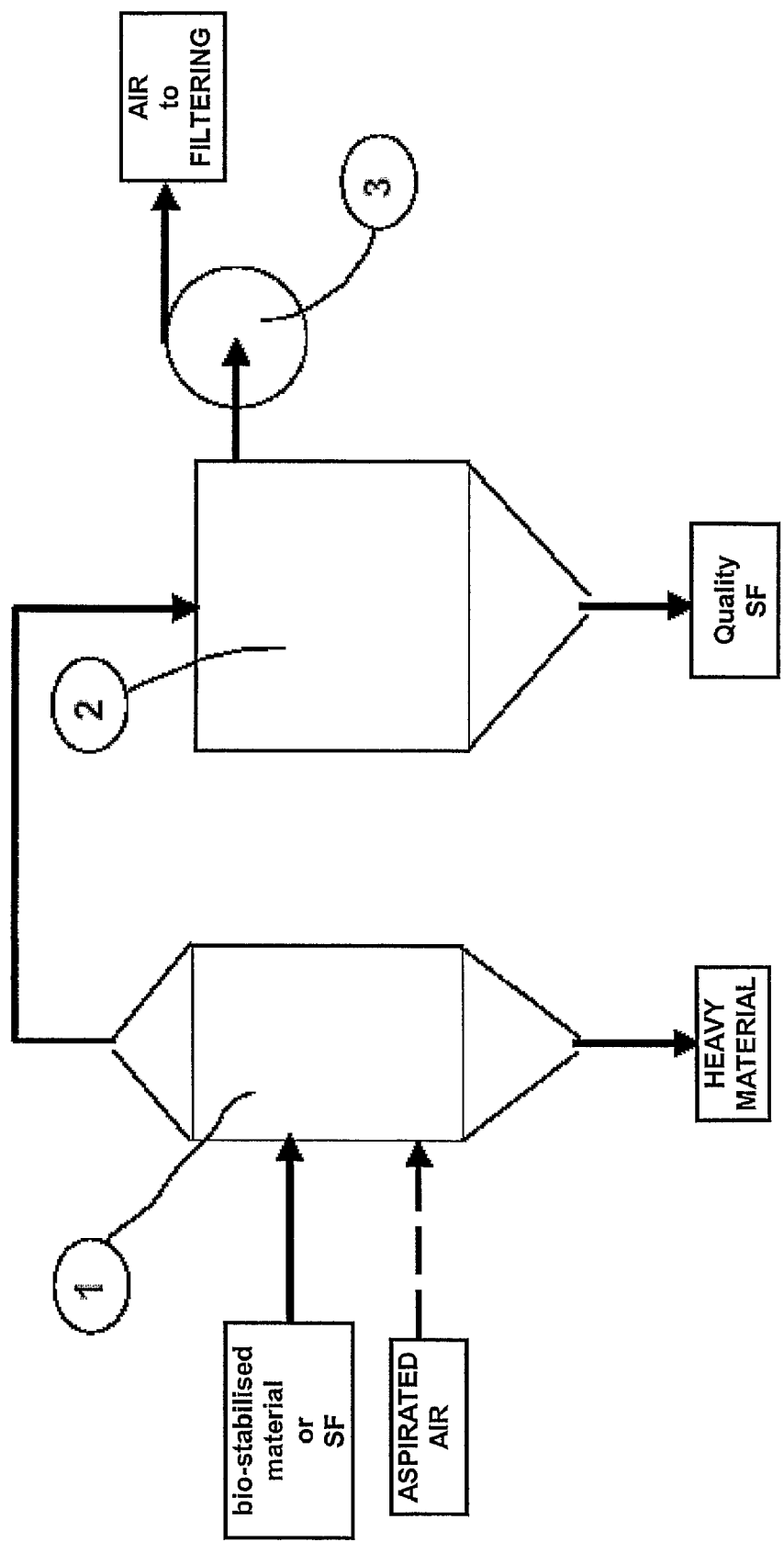
FIG. 3  FLUID-DYNAMIC SEPARATION OF LIGHT MATERIAL (plastic, plastic/paper)

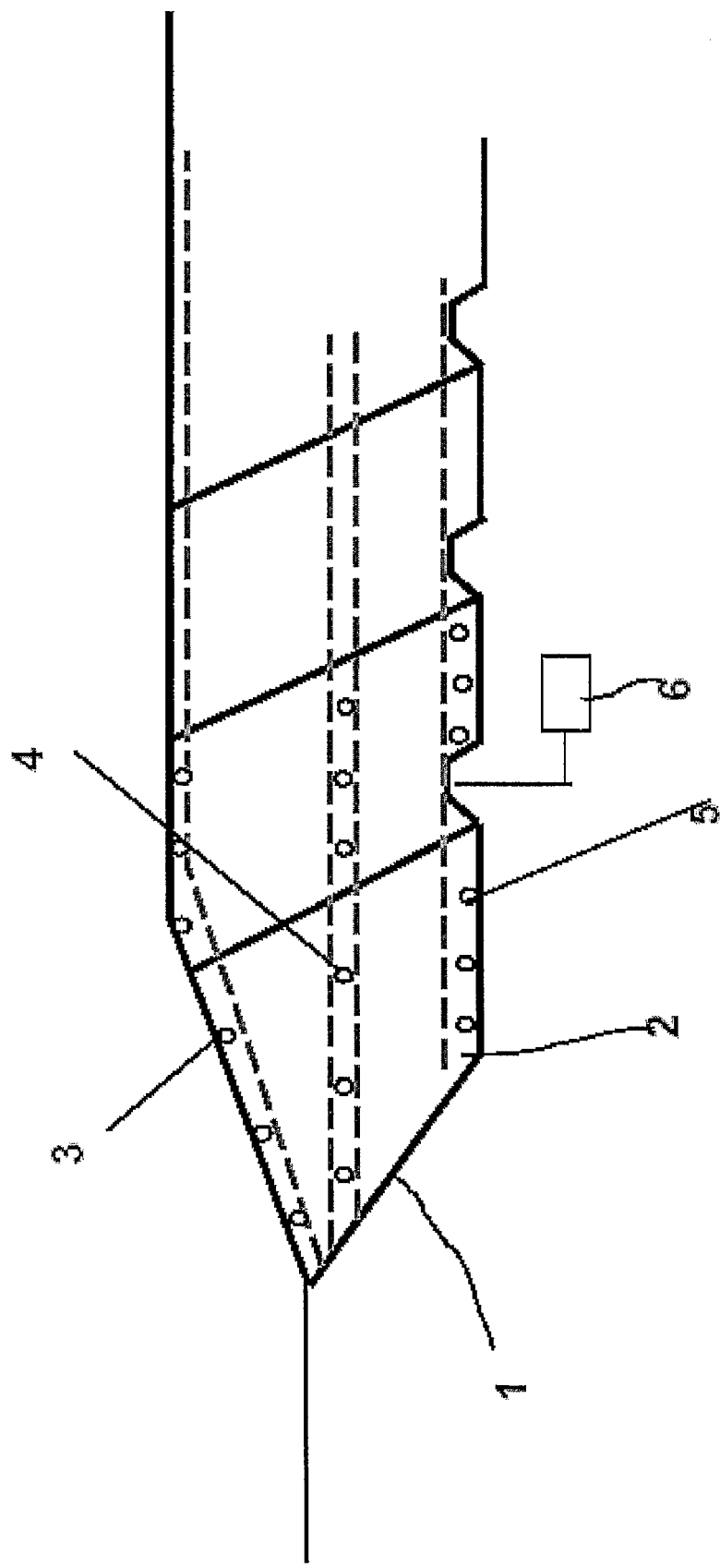
FIG. 4 VERTICAL SECTION OF A SERIES OF BIOREACTORS

METHOD FOR THE PRODUCTION OF NATURAL ENERGY FROM WASTE

This application claims Priority to PCT/EP05/04099 filed 18 Apr. 2005.

FIELD OF APPLICATION

The present invention relates to the life cycle of waste and more particularly municipal solid waste (MSW) also after selective collection, or of fractions obtained or derived from the same.

More particularly the present invention relates to an integrated process of known technologies such as the BIO-CUBES process for the stabilisation of MSW, the incineration of fuels derived therefrom, with new technologies such as the separation of the fractions with high low heat value (LHV), and the use of fractions with a low LHV in bioreactors for the production of biogas.

The anaerobic/aerobic bioreactor is not therefore the equivalent of current landfills, having a shorter life and with the possibility of full recovery at end of life.

The present invention discloses a method and a process for inserting new technologies in the life cycle of waste for the purpose of continuous production of electrical or heat energy without ash to be inertised and dumped.

STATE OF THE ART

Municipal solid waste (MSW) from selective collection, after having been compacted, is generally dumped in controlled landfills with previously waterproofed bases according to the prior art (conventional landfill).

The growing production of waste and the consequent need for further spaces for controlled landfills have led to the development of methods of disposal as alternatives to dumping in conventional landfills.

It should also be noted that these landfills have considerable environmental problems and problems of social acceptability both during their start-up and cultivation and in territorial recovery at end of life.

The life of a landfill is around 20 years during which biogas is produced up to 150 Nm3/t MSW, i.e. approximately 300 Nm3/t of degradable organic material.

In the USA, where the availability of land does not pose a problem but where the production of waste is showing a strong increase, research is underway to improve the performances of MSW landfills.

In this respect mention is made here of the Outer Loop Landfill project (Louisville, Ky.), presented at the US EPA Workshop conference on bioreactor landfills, 27-28 Feb. 2003, Arlington, Va., which includes quantitative studies on the performances of both anaerobic and combined aerobic/anaerobic landfills with accelerated digestion through recycling of the percolate.

Patent application US 2003/0108394 claims the conversion of conventional landfills in aerobic conditions to accelerate the process of conversion of the biodegradable waste portion.

Contrarily the European Community (1999/31/EC) lays down a 50% reduction in MSW dumped by 2009 and the development of alternative recovery methods.

A common feature of these alternative methods is the recovery and recycling of at least a fraction (approximately 30%) of the waste through selective collection and combustion of the remaining 70%.

The residue after selective collection comprises an easily digestible fraction composed of wet organic materials, a non-combustible inorganic fraction composed of glass and metals, and a combustible fraction with high low heat value (LHV) comprising packaging material, material of a plastic nature, wood, card and paper as shown in Table 1.

TABLE 1

Typical composition of MSW after selective collection

| | Composition % | Humidity % | Ash % | Oxidable fraction % | Carbon % | Degradable fraction % | LHV kcal/kg |
|---|---|---|---|---|---|---|---|
| Paper and cellulose material | 27 | 9.5 | 1.6 | 15.9 | 9.6 | 27 | 2387 |
| Wood | 6 | 1.8 | 0.1 | 4.1 | 2.4 | 6 | 2949 |
| Plastic | 18 | 1.1 | 1.6 | 15.3 | 11.8 | 0 | 6764 |
| Glass and inert material | 4 | 0.1 | 3.9 | 0 | 0 | 0 | −15 |
| Metals | 4 | 0.2 | 4.8 | −1 | 0 | 0 | −30 |
| Organic | 29 | 20.3 | 4.4 | 4.3 | 3.8 | 29 | 272 |
| Screened waste | 12 | 3.6 | 5.4 | 3 | 1.3 | 7.2 | 921 |
| TOTAL | 100 | 36.6 | 21.8 | 41.6 | 28.9 | 69.2 | 2226.55 |

The option preferred to date has been the combustion of MSW with production of electrical energy and dumping of the ash, but this option too poses environmental problems and those of acceptability by the public and above all does not eliminate totally the dumping of the MSW due to the discontinuity of the combustors and the non-uniformity of the material and of the supplies.

For this reason methods have been developed for the transformation of malodorous and heterogeneous waste with high environmental impact into inert, homogeneous materials which are easier to handle and store, in this way providing a definitive solution to the problem of waste and offering various options for the use of derived materials with an increase in the flexibility of the entire cycle of the waste itself.

The application of these new materials in incinerators represents one of the possible options and other uses are possible such as the integration of conventional fuel in cement works or in coal power plants, actual dumping and environmental recovery of conventional landfills at end of life.

Methods are known for the preparation of bio-dried and bio-stabilised materials by means of the heat generated by the aerobic digestion of the digestible fraction present in the waste itself.

In the European patent EP-A-706839, in the name of the same Applicant, a description is given of a method (BIO-CUBES) for the recovery of energy from MSW by the preparation of non-conventional fuel comprising the phases of rough shredding of the waste, accumulation of the same on a porous bed in a closed area, forced aerobic digestion with temperatures up to 65-70° C. until the waste is dried, performed by means of a flow of aspirated air through the waste itself, and removal of odours from the output air by means of bio-filters.

The product bio-dried in this way can be refined by screening, removal of the metals and grinding of the remaining fraction until a maximum final diameter is obtained of a few centimetres.

Italian patent IT-A-1283805 describes a method for the recovery of energy from MSW comprising a phase of initial shredding to homogenise and limit the formation of local pockets of anaerobic digestion and a phase of forced digestion until the waste is dried. The flow of air removes humidity and the digestion stops when the remaining water is not sufficient for sustaining the digestion process. Water is not added during the process. The metals and part of the inert materials are mainly removed from the digested, dry and screened waste, ground to 3 cm.

Patent application BS2002A000055 describes in detail a plant for the bio-drying of waste and an automatic control system for management of the aerobic digestion process.

The bio-dried material which is not yet refined is more homogeneous and has a higher LHV (3000 kcal/kg) than the MSW, has lost approximately 27% in weight mainly in the form of evaporated water and can be usefully adopted in the same grid incinerators in which the actual MSW is burnt.

The refined material obtained from the bio-dried material through screening and separation of the screened waste, grinding and separation of the metals can be usefully adopted in fluidised bed or recirculating bed combustors.

This refined material, which is to be called RDF (Refuse-derived fuel) or SF (secondary fuel), has a low heat value of around 4000 kcal/kg and represents approximately 50% of the original MSW.

The disadvantage of this method of incineration is above all the ash content of the bio-dried material, and to a smaller extent of the SF, which have to be rendered inert and dumped.

Moreover the presence of the ash and of considerable quantities of salts and mainly chlorides considerably limits the thermoelectric yields of the incineration plants which normally do not exceed 25%.

While awaiting availability of incineration plants able to meet the ever-increasing production of MSW, the bio-stabi-lised materials or RDF/SF can usefully be stored in a landfill wherefrom they can if necessary be recovered later.

Patent application VI2002A000196 of the same Applicant discloses a method for reclaiming, by the use of bio-dried material compressed into bales (BIOCUBES), conventional landfills at end of life with environmental benefits and territorial recovery of the landfill. The landfill is in fact covered with a layer of clay (and not with an impermeable sheet) which allows rapid rooting of vegetation.

Numerous landfills have also been constructed composed solely of bio-dried material compressed into bales which have demonstrated negligible environmental impact not only during their construction but also during the first years' service.

The bio-dried material does not emit odours and biogas and does not produce percolate.

Rain is absorbed by the covering clay, evaporates and is absorbed by the vegetation and, even in the case of heavy rainfall, its penetration is limited to a few centimeters of bio-dried material. The material has in fact water absorbency up to 60% of its weight.

It was later found that, contrarily, following abundant wetting, the bio-stabilised material has high anaerobic reactivity.

Patent application MI2003A001903 in the name of the same Applicant discloses a method and a system for activating a landfill of bio-dried/bio-stabilised material with high biogas production and reduced service times to exhaust the biodegradable material of the landfill.

The disadvantage of this method is the non-use of the fraction with a high energy and non-degradable content such as plastic, which could be usefully adopted for the production of energy.

DESCRIPTION OF THE INVENTION

The general object of the present invention is that of eliminating the disadvantages stated above, making available a method and a process which allows exploitation of the energy content of waste with production of fractions with high LHV such as plastic, plastic/paper and biogas.

A particular object is that of making available a method of separation, starting with bio-dried and bio-stabilised MSW or with RDF/SF, of the noble fractions of the waste such as plastic and paper for energy uses and of almost totally eliminating the inevitable production of high quantities of slag and ash produced in the combustion of both MSW as-is and of the normal fuels derived therefrom.

A further object is that of making available a method for recovering high level energy in the form of biogas from the less noble residues composed of inert material and bio-stabilised organic material.

An additional object is that of making available a method for the construction of watertight bioreactors which can be activated and with continuous production of biogas intensively for energy use.

Yet another object is that of enabling full inertisation of the materials at the end of life of the bioreactors with possible recovery of the residues and of the area occupied by the same bioreactors.

These objects and others which are to be explained in greater detail herein below are achieved by a method and by a process which considers the entire life cycle of the waste and integrates known technologies with new technologies able to end the same life cycle.

The method therefore constitutes an alternative to the traditional system of combustion in incinerators of MSW and of fuels derived therefrom and their dumping in a landfill.

The method is applied both to raw bio-stabilised material and to refined types (SF, RDF) described in the aforesaid patents, and achieves its aims through insertion in the treatment procedure of the fluid-dynamic separation of the plastic and cellulose materials and through the use of bioreactors for processing the materials with low heat value.

Referring to FIG. 1, applied to raw bio-stabilised material, the process can be schematised as follows:
 a) Bio-stabilisation by the BIOCUBES method with the aim of converting the MSW into a dry, homogeneous material, with size of around 20-30 cm, easily treatable.
 b) After screening of the bio-stabilised material to eliminate the fines and screened waste, fluid-dynamic separation with a special machine which aspirates flyaway material consisting of plastic and paper and collects it in a quiet area wherefrom it is taken and which, once ground to a size of 2-3 cm, constitutes the so-called quality RDF or SF with high heat value. The heavy material is not entrained and is extracted and the dust is filtered from the entrainment air.
 c) The screened waste, heavy material and dust of the previous stage are compressed into bales and arranged in an orderly manner in bioreactors which, once filled, can be sealed and activated by feeding water for producing biogas. The production of biogas is particularly efficient compared to that which can be obtained in a conventional landfill due to the particular nature of the material previously digested aerobically by the BIOCUBES method and due to the reduced presence of non-biodegradable organic elements. The dimensions of the bioreactors and the times for completion of the anaerobic process are reduced and it appears possible to combine a series of bioreactors which in time ensure continuous production of biogas.
 d) After the production of biogas the bioreactor is converted aerobically so as to be dried and stabilised, and the space and residual material recovered if necessary.

Alternatively it is possible to perform separation of the fractions with high heat value from SF according to the diagram in FIG. 2.

The diagram is simplified as some of the operations are performed as part of the production of SF and in particular involves:
 a) Production of SF through bio-stabilisation, screening, grinding and removal of metals as described in IT-A-1283805. In this way, from 100 kg of MSW, approximately 50 kg of SF of size reduced to 2-3 cm are obtained, with heat value of around 4000 kcal/kg. The residues are evaporated water, screened waste and metals.
 b) Fluid-dynamic separation with a system of aspiration similar to that of the diagram of FIG. 1 yet operating in more controlled and bland conditions and able to enrich the product in the plastic fraction with separation of dust and heavy materials.
 c) Compacting of the heavy materials and dust with the screened waste of the SF production, their placing in the bioreactors and activation for the anaerobic production of biogas.
 d) Having exhausted the bioreactor, blowing or aspiration of air and recovery of the bioreactor and of the materials contained therein.

The diagrams of FIGS. 1 and 2 are examples and can be modified by adding other operations and/or recycling of materials, bio-drying, sorting of the plastics and of the paper and refinement of the biogas residues in high-efficiency sealed bioreactors being essential for the purpose of the present invention.

Bio-drying is described extensively in the aforesaid patents and its function is to dry and stabilise the waste, enabling the sorting of materials and the production of particularly reactive substrates with possible activation for the anaerobic digestion in the bioreactors.

Sorting of the materials is carried out in aspiration equipment such as that represented schematically in FIG. 3.

The materials constituting the raw or refined bio-dried material are fed into a chamber 1 where the light material and dust are entrained by the current of air which from the outside permeates from the entry doors while the heavy material is extracted from the base.

The current of air with the entrained materials is aspirated into a sedimentation chamber 2 by a fan 3.

The coarse solids are sedimented and extracted from the base of said sedimentation chamber while the finer particles formed by organic and inert materials are aspirated by the fan 3 and sent for filtering.

The number of revs of the fan 3 is controlled so as to vary the flow rate and hence the speed of the aspirated air and ensure maximum recovery of the fraction with highest LHV, that is to say of the plastic, even if accompanied by a significant portion of the paper and cellulose materials fed.

As will be made clear from the application examples, the working conditions and efficiency of separation depend on the nature of the base material, whether bio-dried or SF.

By basing on 100 kg of MSW of the type shown in Table 1 it is possible to obtain 20-35 kg of quality SF with an LHV of around 4500-5500 kcal/kg and 35-45 kg of organic residue to be sent to the bioreactors.

The residual part mainly consists of a degradable, non-digestible and biologically inactive component, as it has an insufficient water content for triggering the process.

The idea of the present invention is that of degrading this component in a confined and controlled manner in order to reduce its volume, eliminating potential environmental impact and at the same time producing a certain quantity of renewable energy.

This component, placed inside the reactor in cells specially prepared for trapping the biogas produced, will be "activated" with water until achieving in the mass the 45% humidity required for initiating biological digestion processes of the anaerobic type with optimal kinetics.

In time the use of water may be reduced, replacing it with the percolate produced.

These processes lead to an overall production of biogas of around 250 Nm3/t of degradable substance, to be spread over the six years of activity of the bioreactor with an exponential reduction.

This value is approximately double that referred to the tonne of MSW, having removed the plastic and a part of the relatively undegradable products, and the volume of the bioreactor is reduced with higher efficiency.

The production of biogas necessarily entails volatilisation of a part of the organic content present which allows a reduction in the mass sent to the bioreactor of 17% the first year which then gradually reduces to the 3% of the $6^{th}$ year. Overall the mass is reduced by 50% approximately.

The methane produced in anaerobic decomposition is only the final product in a degradation chain composed of numerous organic components.

In order to eliminate completely these components and establish definitively the residue accumulated, air is to be blown inside the mass during the seventh year after depositing.

This process is to take place using the gas trapping lines, blowing air in a pulsed manner and at the same time aspirating in the intervals between pulses.

This process, in addition to eliminating the residual anaerobic component, will encourage a rise in the temperature of the mass itself and elimination of most of the water (70%) added at the time of bioactivation. It is estimated that the waste mass is reduced by a further 2%.

At the end of the anaerobic/aerobic activation process the mass will be reduced by 52% in relation to the organic residue quantity accumulated initially.

The remaining residue will mainly consist of inert components and a humified organic residue capable of complexing the metals present and avoiding their leeching.

This residue will also be easy to screen, and an amount thereof—which can be estimated at 5-10%—can be reused as RDF in order to reduce its volume further.

The overall reduction in mass and hence also in volume will entail as a result the doubling of the original planned deposit capacity of the pit.

The recovery of electrical energy, obtained through combustion of the biogas in internal combustion engines, is also significant and, added to the energy recovery ensured by the use of quality SF for example in cement works, gives a very interesting overall energy value and one of the highest possible.

If the space set up for a conventional landfill is to be used as a bioreactor, some technical changes are required.

In this case the sectors should first of all be separated into 2 or More subsectors in order to facilitate management of the process of the bioreactor and with the aim of activating the bioreactors in sequence in time to give a continuous production of biogas.

FIG. 4 shows a vertical section of a sequence of bioreactors which can be achieved in time, typically every six months or a year, with the production of the organic residue, cove red by the impermeable sheet 1.

The drainage system for control of the seal of the sheet 2, set up for collecting the percolate, is also used simultaneously for trapping the biogas with a hydraulic guard system.

During placing of the residues compressed into bales, a network of slotted pipes 4 is laid in a subhorizontal pattern, similar to that placed on the base 5, approximately midway on the embankment. After depositing and filling of the cell, an additional network of slotted pipes 3 is laid in the regularisation layer on the surface of the waste before laying of the final covering sheet.

All the systems mentioned above are connected to the unit for regulation and aspiration of the biogas 6.

In order to achieve excellent humidification of waste so as to trigger the process of biodegradation and consequent significant production of biogas, the series of slotted pipes 3 placed in the surface regularisation layer is used to inject the water and/or recirculate the percolate for the purpose of activation and control of the process.

As mentioned previously, once the anaerobic phase has ended, the various systems of pipes described above are used to blow air and restore aerobic conditions and definitively stabilise the residue accumulated.

Biogas can be used, similarly to quality SF, in a combustion system for the production of heat and/or electrical energy or in cement works.

For example it can be used to integrate the fuels of thermoelectric power plants or for raising the heat content of steam in waste incineration plants in place of conventional fuels, obtaining thermoelectric yields higher than 30%.

Advantageously it may be used in internal combustion engines, possibly mobile and equipped with an alternator for the production of electrical energy which can be used on site, or fed into the distribution network with electrical yields of around 35-40%.

The results obtained with the present invention are given in the following examples of application based on the experience of industrial bio-drying plants, on experiments in the separation of plastics from bio-dried material and SF and on in-field tests on available landfills.

EXAMPLE 1

Referring to MSW such as that given in Table 1 and represented in the block diagram of FIG. 1, this waste is processed in a BIOCUBES plant able to serve a pool of users having a production of 60,000 t/a.

Approximately 72 kg of bio-dried material with the composition shown in Table 2 are obtained from 100 kg of MSW.

To achieve residual humidity of 19%, stabilise the waste and prepare the degradable organic part for anaerobic digestion, only 5% of the energy originally presented in the MSW is consumed.

TABLE 2

| | Bio-dried material from the MSW of Table 1 | | | | | | |
|---|---|---|---|---|---|---|---|
| | Composition % | Humidity % | Ash % | Oxidable fraction % | Carbon % | Degradable fraction % | LHV kcal/kg |
| Paper and cellulose materials | 26.44 | 4.93 | 2.23 | 19.29 | 12.94 | 26.44 | 2996.0 |

TABLE 2-continued

Bio-dried material from the MSW of Table 1

|  | Composition % | Humidity % | Ash % | Oxidable fraction % | Carbon % | Degradable fraction % | LHV kcal/kg |
|---|---|---|---|---|---|---|---|
| Wood | 6.78 | 0.93 | 0.14 | 5.70 | 3.23 | 6.78 | 3632.0 |
| Plastic | 24.08 | 0.57 | 2.23 | 21.29 | 15.90 | 0.00 | 7033.4 |
| Glass and inert materials | 5.48 | 0.05 | 5.43 | 0.00 | 0.00 | 0.00 | −15.2 |
| Metals | 5.39 | 0.10 | 6.68 | −1.39 | 0.00 | 0.00 | −31.0 |
| Organic | 21.33 | 10.54 | 6.12 | 4.67 | 5.12 | 21.33 | 458.7 |
| Screened waste | 10.49 | 1.87 | 7.51 | 1.11 | 1.75 | 6.30 | 1081.4 |
| TOTAL | 100 | 19.00 | 30.33 | 50.67 | 38.94 | 60.85 | 2941.2 |

The bio-dried material is fed into the aspiration machine described in FIG. 3, from which, for 100 kg of MSW, 33 kg of quality SF are obtained, approximately 90% consisting of plastic and paper with reduced ash content and high LHV as per Table 3.

TABLE 3

Quality SF from bio-dried material

|  | Composition % | Humidity % | Ash % | Oxidable fraction % | Carbon % | Degradable fraction % | LHV kcal/kg |
|---|---|---|---|---|---|---|---|
| Paper and cellulose materials | 46.25 | 8.62 | 3.89 | 33.73 | 22.62 | 46.25 | 2996.0 |
| Wood | 4.44 | 0.61 | 0.09 | 3.74 | 2.12 | 4.44 | 3632.0 |
| Plastic | 42.12 | 1.00 | 3.89 | 37.22 | 27.81 | 0.00 | 7033.4 |
| Glass and inert materials | 0.12 | 0.00 | 0.12 | 0.00 | 0.00 | 0.00 | −15.2 |
| Metals | 0.12 | 0.00 | 0.12 | 0.00 | 0.00 | 0.00 | −31.0 |
| Organic | 4.66 | 2.30 | 1.34 | 1.02 | 1.12 | 4.66 | 458.7 |
| Screened waste | 2.29 | 0.41 | 1.64 | 0.24 | 0.38 | 2.29 | 1081.4 |
| TOTAL | 100 | 12.95 | 11.09 | 75.96 | 54.05 | 57.65 | 4555.3 |

The 39 kg of residue, consisting of heavy and fine material which does not sediment in the aspiration machine, have a high content of ash and organic material which can be activated and a low LHV, as shown in Table 4.

This material has a low value as fuel yet, compressed into bales, can be usefully placed in a bioreactor for the production of biogas which, approximately 50% composed of methane, has an LHV of around 4400 kcal/Nm3, is without ash and can be fed directly to internal combustion engines with thermoelectric yields of between 35 and 40%.

TABLE 4

| | Residue which can be activated | | | | | | |
|---|---|---|---|---|---|---|---|
| Composition | | Humidity | Ash | Oxidable fraction | Carbon | Degradable fraction | LHV |
| | % | % | % | % | % | % | kcal/kg |
| Paper and cellulose materials | 9.75 | 1.82 | 0.82 | 7.11 | 4.77 | 9.75 | 2996.0 |
| Wood | 8.75 | 1.21 | 0.18 | 7.36 | 4.17 | 8.75 | 3632.0 |
| Plastic | 8.88 | 0.21 | 0.82 | 7.85 | 5.86 | 0.00 | 7033.4 |
| Glass and inert materials | 10.00 | 0.09 | 9.90 | 0.00 | 0.00 | 0.00 | −15.2 |
| Metals | 9.84 | 0.19 | 12.21 | −2.56 | 0.00 | 0.00 | −31.0 |
| Organic | 35.39 | 17.48 | 10.16 | 7.75 | 8.49 | 35.39 | 458.7 |
| Screened waste | 17.41 | 3.10 | 12.46 | 1.85 | 2.91 | 9.67 | 1081.4 |
| TOTAL | 100 | 24.10 | 46.55 | 29.35 | 26.20 | 63.55 | 1580.2 |

For the aforesaid pool of users of 60,000 t/year of MSW having a heat content of $1.34\ 10^{11}$ kcal/year, approximately 20,000 t/year of quality SF are produced, with a content of $9.0\ 10^{10}$ kcal/year, equal to 67% of the original energy.

The 23,000 t/year of residue compressed into bales with density of 700 kg/m3 occupy a volume of approximately 33,000 m3 and this can be the volume of the first bioreactor which is to be filled the first year and start production of biogas the following year during filling of the second bioreactor and so on according to the diagram of FIG. 4.

The estimate of the theoretical production of biogas is of the order of 260 Nm3/t of degradable material, and it has been noted that the material treated in this way, once wetted with around 45% humidity, has enhanced activity with reduced production of percolate.

With a life of the bioreactor of six years, it appears possible to exploit 70% of the theoretical biogas with a total production of $2.36\ 10^6$ Nm3, equal to $1.98\ 10^{10}$ kcal, 15% of the original energy contained in the MSW.

In this way up to 82% of the energy of the MSW is used at an energy level and with a content of pollutants such as to allow its use in industrial and energy applications with a higher yield.

At the end of life the bioreactor has a content of material which is around 50% in weight of the initial value and therefore of the same order of magnitude as the ash discharged by a conventional MSW incinerator.

The residue organic material in the bioreactor is treated with air to oxidise the malodorous compounds and to be bio-dried and bio-stabilised.

This material, unlike the ash in the incinerator, does not require special caution during handling and depositing, and therefore can be further sorted for the recovery of the residue plastics, metals and inert substrate exploited in agriculture.

EXAMPLE 2

The diagram of FIG. 2 represents a process which uses, as an alternative to the bio-stabilised material, the refined SF obtained industrially therefrom through screening, fine shredding and removal of metals.

A series of tests was therefore performed on this refined product, normally used in fluidised bed incinerators, on the prototype of the fluid-dynamic separation machine of FIG. 3, in order to assess its performances for the purpose of production of quality SF.

The properties of the SF used are an average size of particles of around 3 cm, homogeneity and high heat value and a composition as shown in Table 5.

SF represents 47% in weight and 79% of the energy contained in the original MSW having already removed from the bio-dried material during screening a 21% fraction known as screened waste and most of the metals.

TABLE 5

Composition of SF

| | Composition % | Humidity % | Ash % | Oxidable fraction % | Carbon % | Degradable fraction % | LHV kcal/kg |
|---|---|---|---|---|---|---|---|
| Paper and cellulose materials | 35.61 | 6.64 | 3.00 | 25.97 | 17.42 | 35.61 | 2996.0 |
| Wood | 9.03 | 1.24 | 0.19 | 7.60 | 4.31 | 9.03 | 3632.0 |
| Plastic | 32.43 | 0.77 | 3.00 | 28.66 | 21.41 | 0.00 | 7033.4 |
| Glass and inert materials | 3.88 | 0.04 | 3.85 | 0.00 | 0.00 | 0.00 | −15.2 |
| Metals | 0.76 | 0.01 | 0.95 | −0.20 | 0.00 | 0.00 | −31.0 |
| Organic | 18.14 | 8.96 | 5.21 | 3.97 | 4.35 | 18.14 | 458.7 |
| Screened waste | 0.15 | 0.03 | 0.11 | 0.02 | 0.02 | 0.09 | 1081.4 |
| TOTAL | 100 | 17.69 | 16.28 | 66.02 | 47.52 | 62.87 | 3759.6 |

Very regular operation of the system of feeding and of the entire aspiration machine, which operates at low speeds and with low air flow rates, was noted.

The product collected in the sedimentation chamber represents approximately 23-24% in weight and 56% in energy of the original MSW, has a high content of plastic and an LHV close to that of a conventional fuel as shown in Table 6.

The residual fractions consisting of the screened waste rejected in the production of SF, the heavy materials not aspirated by the separation machine and the light material withheld by filtering of the air are combined in a single organic residue whose balance-estimated composition is of the type shown in Table 7.

TABLE 6

Quality SF from MSW

| | Composition % | Humidity % | Ash % | Oxidable fraction % | Carbon % | Degradable fraction % | LHV kcal/kg |
|---|---|---|---|---|---|---|---|
| Paper and cellulose materials | 35.14 | 6.55 | 2.96 | 25.63 | 17.19 | 35.14 | 2996.0 |
| Wood | 3.56 | 0.49 | 0.07 | 3.00 | 1.70 | 3.56 | 3632.0 |
| Plastic | 57.60 | 1.37 | 5.32 | 50.91 | 38.03 | 0.00 | 7033.4 |
| Glass and inert materials | 0.08 | 0.00 | 0.08 | 0.00 | 0.00 | 0.00 | −15.2 |
| Metals | 0.02 | 0.00 | 0.02 | 0.00 | 0.00 | 0.00 | −31.0 |
| Organic | 3.58 | 1.77 | 1.03 | 0.78 | 0.86 | 3.58 | 458.7 |
| Screened waste | 0.03 | 0.01 | 0.02 | 0.00 | 0.00 | 0.02 | 1081.4 |
| TOTAL | 100 | 10.18 | 9.50 | 80.32 | 57.78 | 42.30 | 5250.0 |

This organic residue represents approximately 44% of the original MSW and is significantly richer than that of the previous case, above all due to the high content of paper and cellulose materials.

Having then been subjected to shredding during production of SF, higher reactivity in the subsequent phase of anaerobic digestion is expected.

TABLE 7

Organic Residue

|  | Composition % | Humidity % | Ash % | Oxydable fraction e % | Carbon % | Degradable fraction % | LHV kcal/kg |
|---|---|---|---|---|---|---|---|
| Paper and cellulose materials | 23.83 | 4.44 | 2.01 | 17.38 | 11.66 | 23.83 | 2996.0 |
| Wood | 9.01 | 1.24 | 0.18 | 7.58 | 4.30 | 9.01 | 3632.0 |
| Plastic | 8.05 | 0.19 | 0.74 | 7.11 | 5.31 | 0.00 | 7033.4 |
| Glass and inert materials | 8.78 | 0.08 | 8.69 | 0.00 | 0.00 | 0.00 | −15.2 |
| Metals | 1.02 | 0.02 | 1.26 | −0.26 | 0.00 | 0.00 | −31.0 |
| Organic | 32.43 | 16.02 | 9.31 | 7.10 | 7.79 | 32.43 | 458.7 |
| Screened waste | 16.88 | 3.01 | 12.08 | 1.79 | 2.82 | 10.13 | 1081.4 |
| TOTAL | 100 | 25.01 | 34.28 | 40.71 | 31.87 | 75.40 | 1937.0 |

The theoretical production of biogas is greater and around 300 Nm3/t of residue due to the higher content of degradable fraction.

However appreciable differences in reactivity compared to the previous case were not seen, possibly due to the greater inertia of the paper compared to anaerobic degradation.

The main advantage is still that of the high LHV of the quality SF and the improved processability of the material with a slightly more complex plant and bioreactors of greater size.

In both cases exploitation of most of the original energy contained at a low level in the waste is obtained and which, through natural methods such as aerobic and anaerobic digestion, is taken to interesting levels for industrial exploitation.

The disadvantages of conventional incineration are also eliminated, such as low thermoelectric yields and the production of slag and ash which must be treated and dumped.

The procedure described with the use of the bioreactor does not cause environmental impact during its filling and during service and the material produced is not waste but can be returned into the natural cycle.

The invention claimed is:

1. A method for the production of natural energy from municipal solid waste (MSW), comprising the following steps:
   bio-stabilisation to transform the MSW into a dry and homogeneous unrefined material which is rich in biodegradable and inert substances and is easy to handle;
   b) fluid-dynamic separation of the unrefined material to provide a fraction rich in materials with high heat value constituting the quality secondary fuel (SF) and a residue of heavy material and dust;
   c) compacting and storing said residue in bioreactors, wherein said bioreactors can be sealed and activated;
   d) activating the bioreactors with water and service of said bioreactors during anaerobic digestion for the production of biogas;
   e) bio-stabilisation and dehydration of the residual material with air after the anaerobic digestion of said stored residue from step c in the bioreactors; and
   f) recovery of the biogas and bio-stabilized and dehydrated residual material.

2. The method according to claim 1, wherein in said fluid-dynamic separation of flyaway materials consisting of plastic and paper are aspirated forming said quality SF, while the heavy materials are not entrained and are separated, and the dust is filtered by the entrainment air.

3. The method according to claim 1, wherein said bio-stabilized and dried material is screened upstream of said fluid-dynamic separation step to eliminate the fine materials and screened waste, and said bio-stabilized and dried material is ground to a particle size of 2-3 cm, downstream thereof.

4. The method according to claim 1, wherein upstream of said fluid-dynamic separation, the following steps are performed for the production of quality SF:
   a) screening for eliminating fine material and the screened waste;
   b) grinding to a particle size of 2-3 cm; and
   c) removal of metals.

5. The method according to claim 1, wherein the residue fed into the bioreactors contains screened waste, heavy materials and dust.

6. The method according to claim 1, wherein when biogas production stops, said recovered materials are plastic, metals and inert materials.

7. The method according to claim 1, wherein in said step e), when biogas production stops, air is blown inside the mass in said bioreactor in a pulsed manner and is simultaneously aspirated in the intervals between pulses.

8. The method according to claim 1, wherein said fluid-dynamic separation takes place by feeding the raw or refined bin-dried material into a chamber where the heavy materials are removed from the base, while the light materials and dust are entrained by a current of air aspirated in a sedimentation chamber by a fan, the coarse solids being sedimented and removed from the base of said sedimentation chamber, while the finer particles consisting of organic and inert materials are aspirated by the fan and sent for filtering.

9. The method, according to claim 1, wherein said bioreactors containing the mass of compacted residues placed in an impermeable sheet, comprise a network of slotted pipes placed on the base, at least one intermediate network of slotted pipes, and an upper network of slotted pipes, all connected to a unit for regulation and aspiration of the biogas.

10. The method according to claim 9, wherein said upper network of slotted pipes is used to inject the water for humidifying the waste and for triggering the process of biodegradation, and to recirculate the percolate.

11. The method according to claim 9, wherein said networks of pipes are used to blow air inside the mass, when biogas production stops in the bioreactors.

* * * * *